Aug. 4, 1931.  W. F. GOFF  1,817,616
JUMPING ROPE
Filed May 24, 1929
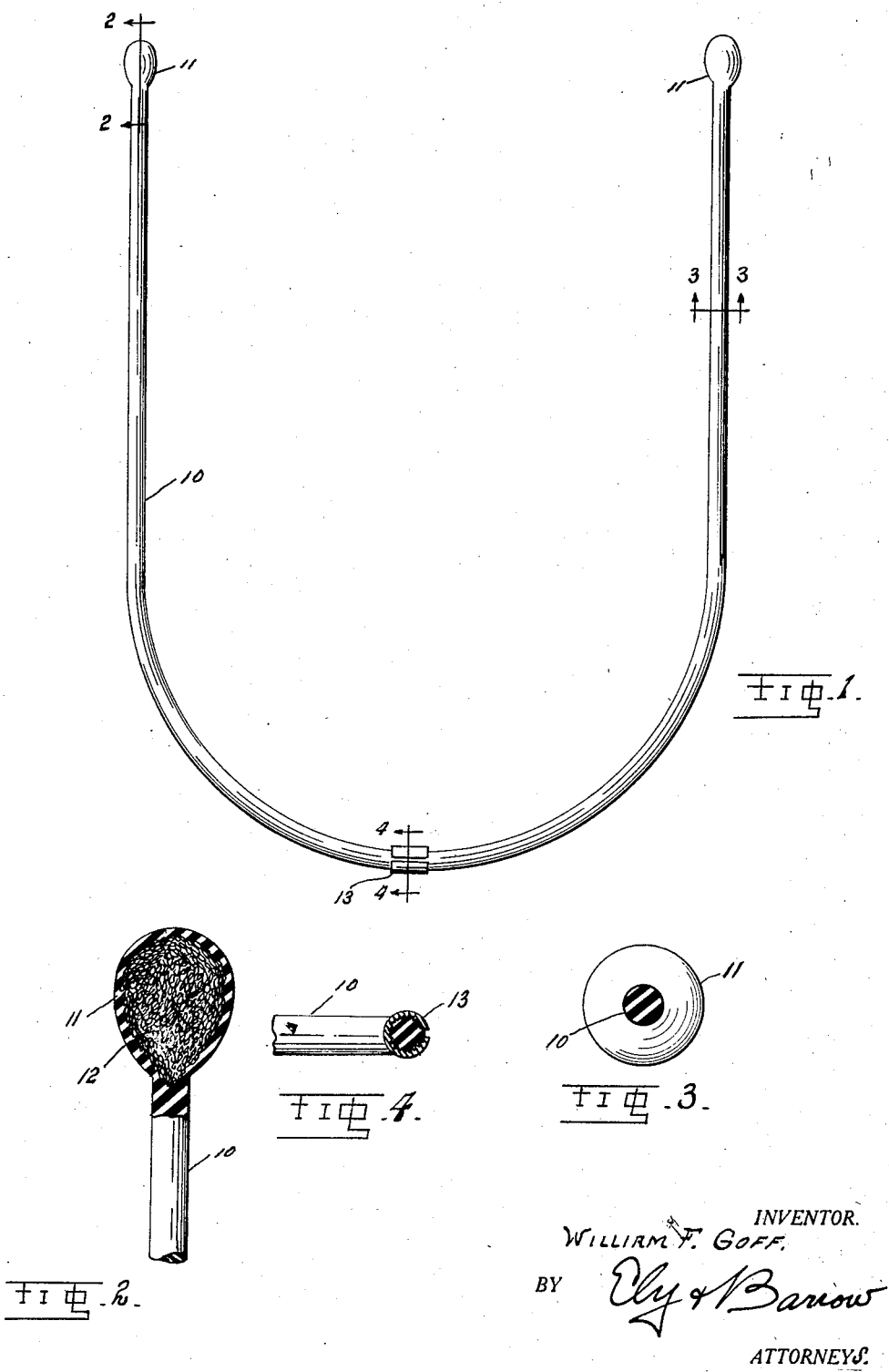
INVENTOR.
WILLIAM F. GOFF.
BY Ely & Barlow
ATTORNEYS.

Patented Aug. 4, 1931

1,817,616

UNITED STATES PATENT OFFICE

WILLIAM F. GOFF, OF AKRON, OHIO

JUMPING ROPE

Application filed May 24, 1929. Serial No. 365,639.

This invention relates to jumping or skipping ropes.

The general purpose of the invention is to provide a jumping or skipping rope of rubber which is capable of inexpensive manufacture and is very efficient in use due to its ability to maintain its "life" and the required degree of flexibility over a long period of time regardless of exposure and also because of its great resistance to abrasion on pavements.

More specifically, the invention has for its purpose the provision of a molded, vulcanized rubber jumping or skipping rope having integral rubber handles so formed as to be comparatively light so that there will be no danger of a flying end of the rope causing an injury, said rope being molded to desired lengths and being adjustable if desired by cutting a piece out of the rope and clamping the ends together.

The foregoing and other objects of the invention are attained in the jumping rope shown in the accompanying drawings and described below. It is to be understood that the invention is not limited to the specific forms thereof shown and described.

Of the accompanying drawings,

Figure 1 is an elevation of a skipping rope embodying the invention.

Figure 2 is a section on line 2—2 of Figure 1.

Figure 3 is a section on line 3—3 of Figure 1; and

Figure 4 is a section on line 4—4 of Figure 1.

Referring to the drawings, the numeral 10 designates a skipping rope comprising a molded length of rubber of flexible resilient vulcanized composition formed with integral knobs 11, 11 providing handles, the cores 12, 12 of which are made of a rubber composition containing a blowing agent such as volatile ammonium compounds whereby the cores 12 are light and spongy.

The rope 10 may be molded to various lengths and may also be adjusted by cutting a piece out of the rope and splicing the ends as by use of a split sleeve 13 preferably formed with a roughened or knurled inner surface and squeezed tightly about the abutting ends of the rope at the joint.

It will appear from the foregoing that a simple, effective jumping rope has been provided by the invention. Obviously, modifications of the invention may be resorted to without departing from the spirit thereof, or the scope of the appended claims.

What is claimed is:

1. A jumping rope comprising a length of molded, flexible vulcanized rubber formed with integral rubber knobs on its ends, said knobs having cores of spongy rubber.

2. A jumping rope comprising a length of molded, flexible vulcanized rubber formed with integral rubber knobs on its ends.

3. A jumping rope comprising a length of molded, flexible vulcanized rubber, said rope being in two parts with the ends butt-jointed and means comprising a split sleeve, the inner surface of which is knurled or roughened and which is clamped about the joint to secure said ends together.

4. A jumping rope comprising a length of molded, flexible vulcanized rubber, said rope being in two parts with the ends butt-jointed and means to secure said ends together.

5. A jumping rope comprising a length of flexible, vulcanized rubber provided with rubber knobs permanently secured to its ends.

WILLIAM F. GOFF.